(12) United States Patent
Baillargeon

(10) Patent No.: US 10,893,425 B2
(45) Date of Patent: Jan. 12, 2021

(54) DYNAMIC RECONFIGURATION OF VIRTUALIZED NETWORK FUNCTION NETWORK CONNECTIVITY

(71) Applicant: Telefonaktiebolaget LM Ericsson (publ), Stockholm (SE)

(72) Inventor: Steve Baillargeon, Gatineau (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/487,470

(22) PCT Filed: Feb. 24, 2017

(86) PCT No.: PCT/IB2017/051104
§ 371 (c)(1),
(2) Date: Aug. 21, 2019

(87) PCT Pub. No.: WO2018/154363
PCT Pub. Date: Aug. 30, 2018

(65) Prior Publication Data
US 2019/0394658 A1    Dec. 26, 2019

(51) Int. Cl.
*H04L 29/08* (2006.01)
*H04W 24/04* (2009.01)
(Continued)

(52) U.S. Cl.
CPC ......... *H04W 24/04* (2013.01); *H04W 40/248* (2013.01); *H04W 56/001* (2013.01); *H04W 80/06* (2013.01)

(58) Field of Classification Search
CPC .............. H04N 21/4437; H04N 21/443; H04L 12/4641; H04L 12/2859; G06F 9/45533;
(Continued)

(56) References Cited

U.S. PATENT DOCUMENTS 10,033,595 B2 *  7/2018  Sif ...................... G06F 9/45533
2007/0266383 A1 * 11/2007  White .................. G06F 9/4856
                                                          718/1
(Continued)

FOREIGN PATENT DOCUMENTS

WO    2016/103069 A1    6/2016

OTHER PUBLICATIONS

International Search Report and Written Opinion of the International Searching Authority dated Nov. 27, 2017 issued in PCT Application No. PCT/IB2017/051104, consisting of 11 pages.
(Continued)

*Primary Examiner* — Aftab N. Khan
(74) *Attorney, Agent, or Firm* — Christopher & Weisberg, P.A.

(57) ABSTRACT

A method, node, and VNF for maintaining a connection-oriented transport protocol association for carrying control plane traffic between a VNF including a first VM having a first external CP, and a remote node. The method includes upon configuration of a second VM, the second VM including a second external CP different from the first external CP of the first VM, notifying the first VM of a presence of the second VM, the notification including the second external CP of the second VM, instructing the remote node to add the second external CP of the second VM to the connection-oriented transport protocol association, and instructing the remote node to send control plane traffic to the second external CP of the second VM.

32 Claims, 14 Drawing Sheets

(51) Int. Cl.
   *H04W 40/24* (2009.01)
   *H04W 56/00* (2009.01)
   *H04W 80/06* (2009.01)

(58) Field of Classification Search
   CPC ......... G06F 11/2023; G06F 2009/4557; G06F 11/2069
   See application file for complete search history.

(56) References Cited

U.S. PATENT DOCUMENTS

| | | | | |
|---|---|---|---|---|
| 2012/0303835 | A1* | 11/2012 | Kempf | H04L 41/0695 709/235 |
| 2016/0057014 | A1* | 2/2016 | Thakkar | G06F 9/45558 709/223 |
| 2017/0017510 | A1* | 1/2017 | Itoh | G06F 9/5077 |
| 2017/0134505 | A1* | 5/2017 | Fujinami | H04W 80/10 |
| 2017/0195431 | A1* | 7/2017 | Tamura | H04W 76/20 |
| 2018/0199218 | A1* | 7/2018 | Ashrafi | H04W 24/04 |
| 2018/0205786 | A1* | 7/2018 | Dong | H04L 67/42 |

OTHER PUBLICATIONS

ETSI GS NFV PER 001 V1.1.2 (Dec. 2014) Title: "Network Functions Virtualisation (NFV); NFV Performance & Portability Best Practises" consisting of 65 pages.
Draft ETSI GS MEC 002 V0.5.1 (Feb. 2016) Title: "Mobile-Edge Computing (MEC); Technical Requirements" consisting of 40 pages.
ETSI GS NFV REL 002 V1.1.1. (Sep. 2015) Title: "Network Functions Virtualisation (NFV); Reliability; Report on Scalable Architectures for Reliability Management" consisting of 32 pages.
R. Stewart et al.,Title: "Stream Control Transmission Protocol (SCTP) Dynamic Address Reconfiguration", Sep. 2007, consisting of 41 pages.
3GPP TS 36.413 V13.4.0 (Sep. 2016) 3rd Generation Partnership Project; Technical Specification Group Radio Access Network; Evolved Universal Terrestrial Radio Access Network (E-UTRAN); S1 Application Protocol (S1AP) (Release 13), consisting of 333 pages.

* cited by examiner

DYNAMIC RECONFIGURATION OF VIRTUALIZED NETWORK FUNCTION NETWORK CONNECTIVITY

CROSS-REFERENCE TO RELATED APPLICATIONS

This application is a Submission Under 35 U.S.C. § 371 for U.S. National Stage Patent Application of International Application Number: PCT/IB2017/051104, filed Feb. 24, 2017 entitled "DYNAMIC RECONFIGURATION OF VIRTUALIZED NETWORK FUNCTION NETWORK CONNECTIVITY," the entirety of which is incorporated herein by reference.

TECHNICAL FIELD

Wireless communication and in particular, a method and node for carrying control or user plane traffic between a virtualized network function (VNF) and a remote node during lifecycle management.

BACKGROUND

FIG. 1 is an illustration of a next generation cloud-based network with network functions virtualization (NFV) management and orchestration architecture (NFV-MANO). The NFV-MANO architectural framework identifies a number of NFV-MANO functional blocks. These include a Virtualized Infrastructure Manager (VIM), which is responsible for controlling and managing a NFV Infrastructure (NFVI) computer, storage and network resources, typically within one operator's Infrastructure Domain Another functional block of the NFV-MANO architecture is the VNF Manager (VNFM), which is responsible for the lifecycle management of VNF instances, e.g., instantiation, software upgrades, scaling in/out/up/down, etc. Each VNF instance is assumed to have an associated VNF Manager. A VNF manager may be assigned the management of a single VNF instance, or the management of multiple VNF instances of the same type or of different types.

Another functional block of the NFV-MANO architectural framework is the NFV Orchestrator (NFVO). The NFVO has two primary responsibilities. The first responsibility is the orchestration of NFVI resources across multiple VIMs, fulfilling the resource orchestration functions. The second responsibility is the lifecycle management of Network Services, e.g., on-boarding new Network Services and VNF Packages, management of the instantiation of VNFMs where applicable, management of the instantiation of VNFs in coordination with VNFMs, etc., and fulfilling the Network Service Orchestration functions. FIG. 1 also illustrates the Operational Support System (OSS)/Business Support System (BSS), which is in communication with one or more element managers (EMs). The OSS/BSS provides a package of end-user (e.g., client) functions with the responsibility for management of the network as supported by the EMs. The EMs provide a package of end-user (client) functions for the management of a set of closely related types of Network Elements.

VNF life cycle management includes instantiating, creating, provisioning, scaling, healing, monitoring, upgrading and termination of the virtual network function component (VNFC) instances, i.e., virtual machines (VMs) that are associated with a VNF instance. The VNF Manager (VNFM) is responsible for the lifecycle management of the VNF instances.

FIG. 2 is an illustration of a typical NFV VNF lifecycle flow. The lifecycle flow includes on-boarding of new VNF packages including virtual network function descriptors (VNFDs) and software images for each virtual deployment unit (VDU)/VNFC, creation of VNF instance identifiers, configuration of VNFs with application specific parameters and scaling of VNFs. However, a VNF requires continuous healing. Each healing request or action is often translated into a reboot or restart of one or more VNFC instances (or VMs) causing a service interruption or termination of the VNF. A VNF also requires continuous development of new functionality and maintenance of the existing functionality. Changes introduced during development and maintenance are often categorized into updates and upgrades. Although there is no formal definition of an update and an upgrade, a very general way of distinguishing them can be as follows:

A VNF update does not introduce new functionality and/or new interfaces.

A VNF upgrade might introduce new functionality and/or new interfaces.

A difference is that VNF upgrades may require planning on a network service level, while VNF updates can be deployed without coordination with other VNFs. The methods of VNF updating and VNF upgrading differ from vendor to vendor. For a specific vendor, the methods may be the same or different for VNF updates and VNF upgrades. All of these methods causing service interruption.

When using these methods, the stream control transmission protocol (SCTP), (or transmission control protocol (TCP) or user datagram protocol (UDP)) transport connection must be "restarted" if a new VM (VNFC or container) hosting the SCTP (TCP or UDP) application is restarted, software-upgraded, or if a new VM (VNFC or container) is added. This is undesirable for applications that are always-on. Upgrading, releasing or restarting a VM or a transport connection in a virtualized radio access network (vRAN) data center deployment radio controller (vRC) or packet processer (vPP) directly impacts many subscribers (momentarily loss of connectivity) across a large number of cells or within a geographical area.

SUMMARY

According to one aspect of the present disclosure, a method of maintaining a connection-oriented transport protocol association for carrying control plane traffic between a virtualized network function (VNF) including a first virtual machine (VM) having a first external connection point (CP), and a remote node, is provided. The method includes, upon configuration of a second VM, the second VM including a second external CP different from the first external CP of the first VM, notifying the first VM of a presence of the second VM, the notification including the second external CP of the second VM, instructing the remote node to add the second external CP of the second VM to the connection-oriented transport protocol association, and instructing the remote node to send control plane traffic to the second external CP of the second VM.

According to an embodiment if this aspect, the VNF, optionally, instructs the remote node to remove the first external CP of the first VM from the connection-oriented transport protocol association. According to another embodiment, the VNF includes the first VM and the second VM. According to another embodiment, the VNF is a virtual radio controller (vRC). According to another embodiment, the method includes receiving an acknowledgement that the remote node has received the instruction to send control plane traffic to the second external CP of the second VM. According to another embodiment, the method further includes receiving an acknowledgement that the remote node has received the instruction to remove the first external CP of the first VM from the connection-oriented transport protocol association.

According to another embodiment, the remote node is a mobility management entity (MME). According to another embodiment, the connection-oriented transport protocol is a stream control transmission protocol (SCTP). According to another embodiment, the connection-oriented transport protocol is a transmission control protocol (TCP). According to another embodiment, the method further includes synchronizing session state information between the first VM and the second VM prior to instructing the remote node to send control plane traffic to the second external CP of the second VM. According to another embodiment, the session state information is synchronized via a first internal CP of the first VM and a second internal CP of the second VM. According to another embodiment, notifying the first VM of the presence of the second VM is via a first internal CP of the first VM and a second internal CP of the second VM.

According to another aspect, a VNF configured to maintain a connection-oriented transport protocol association for carrying control plane traffic between the VNF and a remote node is provided. The VNF includes a first VM having a first external CP the VNF running in a cloud computing environment providing processing circuits and memory for running the VNF, the memory containing instructions executable by the processing circuits. The VNF is configured to, upon configuration of a second VM, the second VM including a second external CP different from the first external CP of the first VM, notify the first VM of a presence of the second VM, the notification including the second external CP of the second VM, instruct the remote node to add the second external CP of the second VM to the connection-oriented transport protocol association, and instruct the remote node to send control plane traffic to the second external CP of the second VM.

According to an embodiment of this aspect, the VNF is further configured to instruct the remote node to remove the first external CP of the first VM from the connection-oriented transport protocol association. According to another embodiment, the VNF includes the first VM and the second VM. According to another embodiment, the VNF is a vRC. According to another embodiment, the VNF is further configured to receive an acknowledgement that the remote node has received the instruction to send control plane traffic to the second external CP of the second VM. According to another embodiment, the VNF is further configured to receive an acknowledgement that the remote node has received the instruction to remove the first external CP of the first VM from the connection-oriented transport protocol association. According to another embodiment, the remote node is a MME. According to another embodiment, the connection-oriented transport protocol is a SCTP. According to another embodiment, the connection-oriented transport protocol is a TCP.

According to another embodiment, the processor is further configured to synchronize session state information between the first VM and the second VM prior to instructing the remote node to send control plane traffic to the second external CP of the second VM. According to another embodiment, the session state information is synchronized via a first internal CP of the first VM and a second internal CP of the second VM. According to another embodiment, notifying the first VM of the presence of the second VM is via a first internal CP of the first VM and a second internal CP of the second VM.

According to another aspect, a method of maintaining a connection-oriented transport protocol association for carrying control plane traffic between a VNF including VM having a first external CP, and a remote node, is provided. The method includes, adding a second external CP of a second VM to the connection-oriented transport protocol association, sending control plane traffic to the second external CP of the second VM, and removing the first external CP of the first VM from the connection-oriented transport protocol association.

According to one embodiment of this aspect, the remote node is a MME. According to another embodiment, the method further includes sending an acknowledgement to the first VM indicating that the remote node has received the instruction to send control plane traffic to the second external CP of the second VM. According to another embodiment, the method further includes sending an acknowledgement to the first VM indicating that the remote node has received the instruction to remove the first external CP of the first VM from the connection-oriented transport protocol association.

According to another aspect, a node configured to maintain a connection-oriented transport protocol association for carrying control plane traffic between a VNF, including a first VM having a first external CP, and the node, is provided. The node includes processing circuitry including a memory and a processor, the memory in communication with the processor, the memory having instructions that, when executed by the processor, configure the processor to add a second external CP of a second VM to the connection-oriented transport protocol association. The node also includes a communications interface configured to send control plane traffic to the second external CP of the second VM. The processor is further configured to remove the first external CP of the first VM from the connection-oriented transport protocol association.

According to an embodiment of this aspect, the node is a MME. According to another embodiment, the communications interface is further configured to send an acknowledgement to the first VM indicating that the node has received the instruction to send control plane traffic to the second external CP of the second VM. According to another embodiment, the communications interface is further configured to send an acknowledgement to the first VM indicating that the node has received the instruction to remove the first external CP of the first VM from the connection-oriented transport protocol association.

According to another aspect, a method of maintaining at least one existing user plane bearer carried over a connectionless transport protocol association between a VNF, including a first VM having a first external CP, and a remote user plane node, is provided. The method includes, upon configuration of a second VM, the second VM including a second external CP different from the first CP of the first VM, informing a control plane node of a presence of the second external CP of the second VM, establishing a new connectionless transport protocol association for at least one new user plane bearer between the second external CP of the second VM and the remote user plane node, synchronizing user plane session state information between the first VM and the second VM, and instructing the control plane node to trigger switchover of the at least one existing user plane bearer to the new connectionless transport protocol association.

According to an embodiment of this aspect, the remote user plane node is a serving gateway (SGW). According to another embodiment, the VNF includes the first VM and the second VM. According to another embodiment, the VNF is a virtual package processer (vPP). According to another embodiment, the control node is a virtual radio controller (vRC). According to another embodiment, the connectionless transport protocol is a user datagram protocol (UDP).

According to another aspect, a virtualized VNF configured to maintain at least one existing user plane bearer carried over a connectionless transport protocol association between the VNF and a remote user plane node is provided. The VNF includes a first VM having a first external CP, the VNF running in a cloud computing environment providing processing circuits and memory for running the node, the memory containing instructions executable by the processing circuits. The VNF is configured to, upon configuration of a second VM, the second VM including a second external CP different from the first CP of the first VM, inform a control plane node of a presence of the second external CP of the second VM, establish a new connectionless transport protocol association for at least one new user plane bearer between the second external CP of the second VM and the remote user plane node, synchronize user plane session state information between the first VM and the second VM, and instruct the control pane node to trigger switchover of the at least one existing user plane bearer to the new connectionless transport protocol association.

According to an embodiment of this aspect, the remote user plane node is a SGW. According to another embodiment, the VNF includes the first VM and the second VM. According to another embodiment, the VNF is a vPP. According to another embodiment, the control plane node is a vRC. According to another embodiment, the connectionless transport protocol is a UDP.

According to another aspect, a node configured to maintain a connection-oriented transport protocol association for carrying control plane traffic between a VNF including a VM having a first external CP, and the node, is provided. The node includes a connection maintenance module configured to add a second external CP of a second VM to the connection-oriented transport protocol association, and a communications interface module configured to send control plane traffic to the second external CP of the second VM. The connection maintenance module is further configured to remove the first external CP of the first VM from the connection-oriented transport protocol association.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
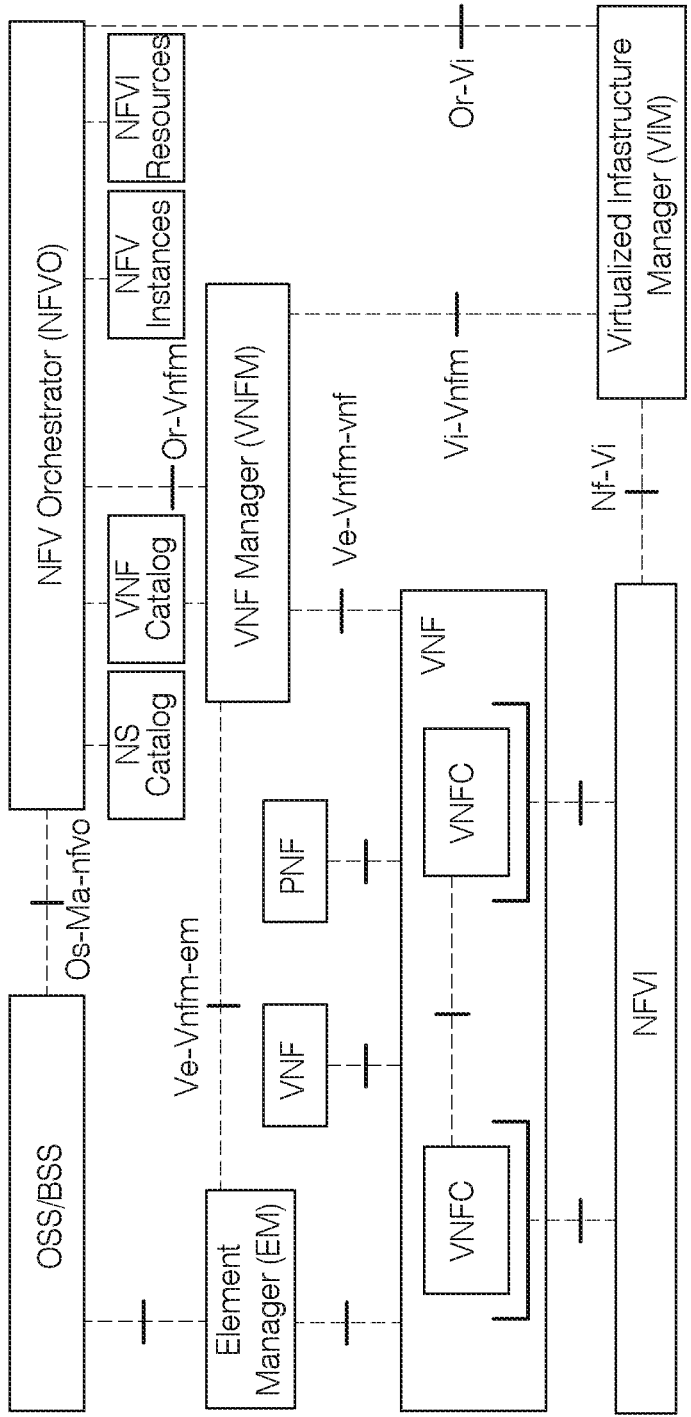
FIG. 1 is a block diagram showing the architecture of a typical cloud-based network having NFV management and orchestration.
Figure 2:
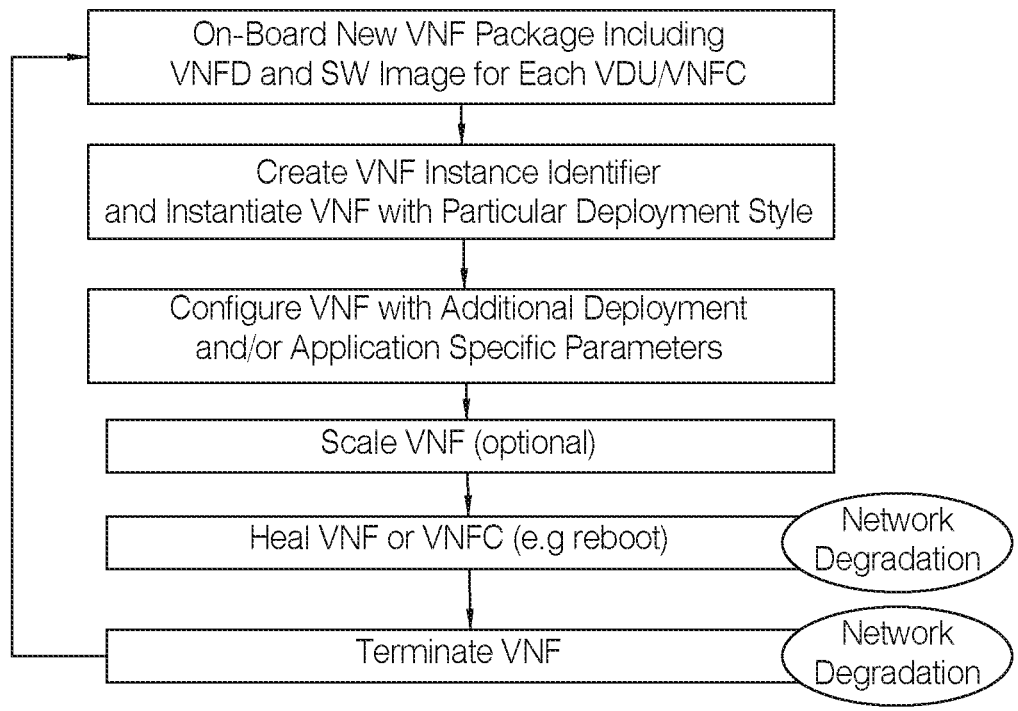
FIG. 2 is a flow diagram showing a typical NFV VNF lifecycle flow.

Before describing in detail exemplary embodiments, it is noted that the embodiments reside primarily in combinations of apparatus components and processing steps related to maintaining a connection-oriented transport protocol association for carrying control plane traffic between a VNF and a remote node during lifecycle management. The proposed apparatus components and processing steps described herein proposes a dynamic addition and subtraction of internet protocol (IP) addresses with high availability (HA) VM configuration (within a VNF) thus allowing an SCTP association, (a TCP connection or a UDP path) to continue to function through VNF LCM healing, i.e., software upgrade/update, scaling etc., procedures. The local VNF advises its peer as to what the VNF believes is the better SCTP IP address that the peer should be using during its VNF life cycle.

Some embodiments of the present disclosure provide for maintaining the VNF network connectivity and session states during the healing and/or software upgrading procedure thus allowing for continuous deployment of fixes and new software updates anytime without the need to plan for a network downtime.

In some embodiments of the present disclosure, upon implementation, there is no need to create secondary VNF instances with a negative impact on the entire network and element manager. The "same connections" are maintained within the network needed for more complex functions where the network peers must continue to communicate with the same VNF instance.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 3:
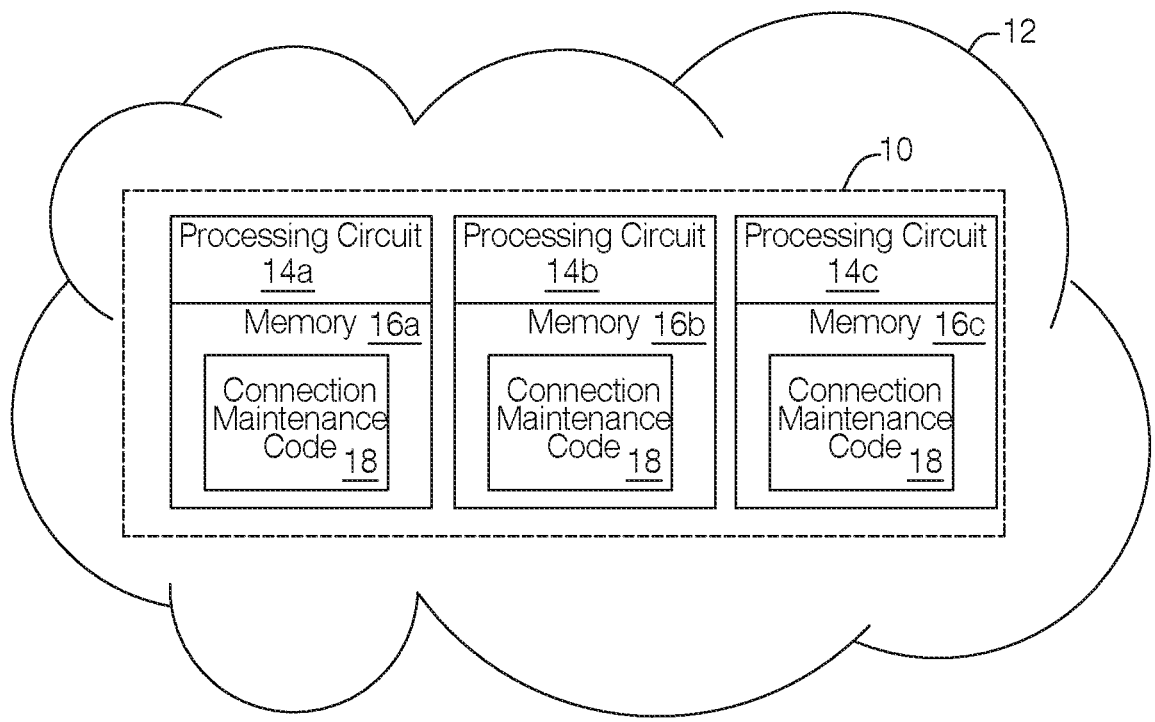
FIG. 3 is a block diagram showing a VNF in a cloud-environment in accordance with principles of the present disclosure.

Referring now to drawing figures in which like reference designators refer to like elements there is shown in FIG. 3 a block diagram of an exemplary virtualized network function (VNF) 10 configured to maintain a connection-oriented transport protocol association for carrying control plane traffic between the VNF 10 and a remote node. VNF 10, which could be, for example, a virtual radio controller (vRC), or a virtual packet processer (vPP), runs in a cloud computing environment 12, the cloud computing environment 12 including processing circuits 14a, 14b, and 14c (collectively "processing circuits 14") and memory 16a, 16b, and 16c (collectively "memory 16") for running VNF 10. Memory 16 also includes connection maintenance code 18. It should be noted that although three processing circuits and three memories are shown in FIG. 3, the present disclosure is not limited to a particular number of processing circuits or memories. Memory 16 contains instructions executable by the processing circuits 14 that, when executed, configures processing circuits 14 to perform the processes described herein.

Figure 4:
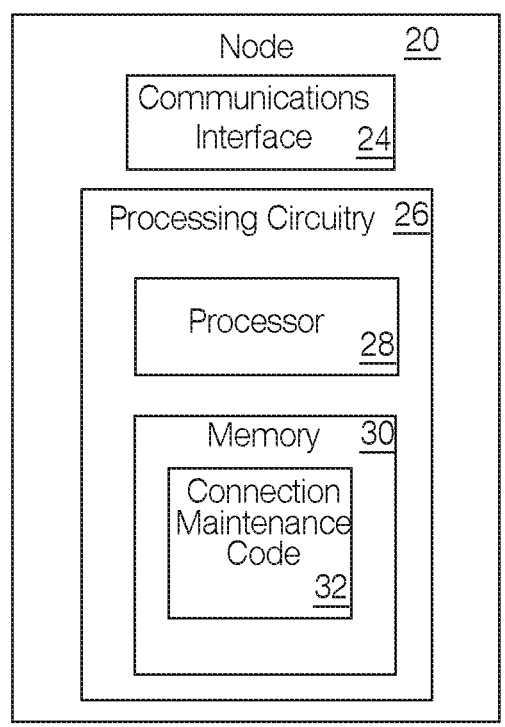
FIG. 4 is a block diagram of a node, such as an MME, in accordance with principles of the present disclosure.

FIG. 4 is a block diagram of an example node 20 (also referred to herein as "remote node" or "remote peer node"), such as, for example, a Mobility Management Entity (MME). Node 20 is configured to maintain a connection-oriented transport protocol association for carrying control plane traffic between VNF 10 and node 20. Node 20 includes communications interface 24, and processing circuitry 26. Processing circuitry 26 includes a memory 28 and a processor 30, the memory 28 in communication with the processor 30. In addition to a traditional processor and memory, processing circuitry 26 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or reading from) memory 28, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by processor 30 and/or other data, e.g., data pertaining to communication, e.g., configuration and/or address data of nodes, etc. Memory also includes connection maintenance code 32. Memory 28 has instructions that, when executed by processor 30, configures processor 30 to perform the processes described herein.

FIGS. 5-13 illustrate one embodiment of the present disclosure relating to lifecycle management (LCM) procedures for a SCTP/TCP engine VM with dynamic address reconfiguration for a connection-oriented transport protocol.

Figure 5:
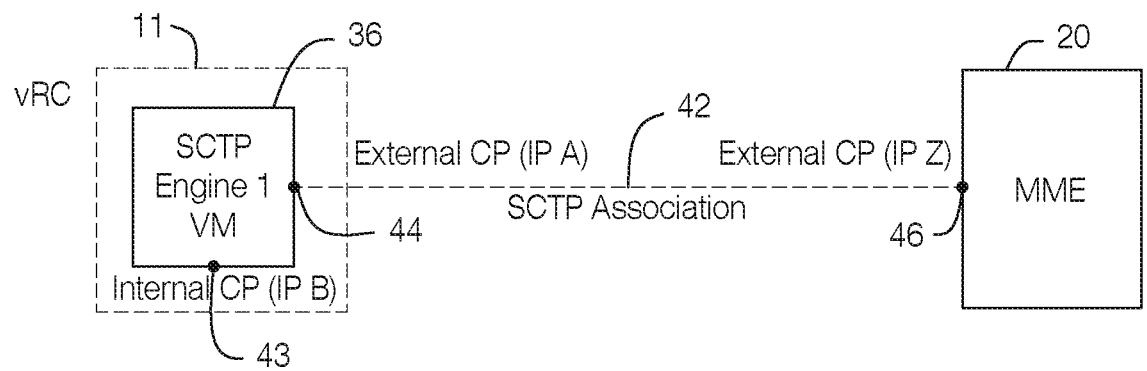
FIG. 5 illustrates an SCTP association between a virtual radio control node and an MME in accordance with principles of the present disclosure.

FIG. 5 illustrates a control plane of a network node in communication with a remote node 20. A network node as used herein is a general term and can correspond to any type of radio network node or any network node which communicates with a wireless device and/or with another network node. Examples of network nodes include, but are not limited to NodeB, base station (BS), multi-standard radio (MSR) radio node such as MSR BS, evolved node B (eNodeB), gNodeB, macro evolved Node B (MeNB), small evolved Node B (SeNB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g., mobile switching center (MSC), MME, etc.), operations & maintenance (O&M), open storage service (OSS), self-organizing network (SON), positioning node (e.g., evolved serving location center (E-SMLC)), minimizing of driving test (MDT), etc.

The network node includes a first SCTP engine VM 36 (also referred to as "first VM 36" or "first SCTP VM instance 36") in communication with a remote node 20 (also referred to as a "remote peer node") via a connection-oriented transport protocol such as, for example, an SCTP association, or a TCP connection 42 established there between. In one embodiment, STCP engine VM 36 is an S1AP protocol on a virtual radio controller (vRC) 11. In the embodiments discussed below and illustrated in FIGS. 5-20, VNF 10 resides on vRC 11. However, it is understood that this is only an exemplary embodiment and VNF 10 need not reside on vRC 11. Remote node 20 could be either a physical node such as an MME, or a virtual node. For the remaining examples (and in the FIGS.), remote node 20 shall be referred to as an MME, it being understood that remote node 20 is not limited to an MME and could be any type of network node supporting the SCTP or TCP protocol, virtual or physical. First SCTP engine VM 36 includes an internal connection point 43 and an external connection point 44. SCTP association 42 is established between external connection point 44 of first SCTP engine VM 36 and an external connection point 46 of remote node 20.

Figure 6:
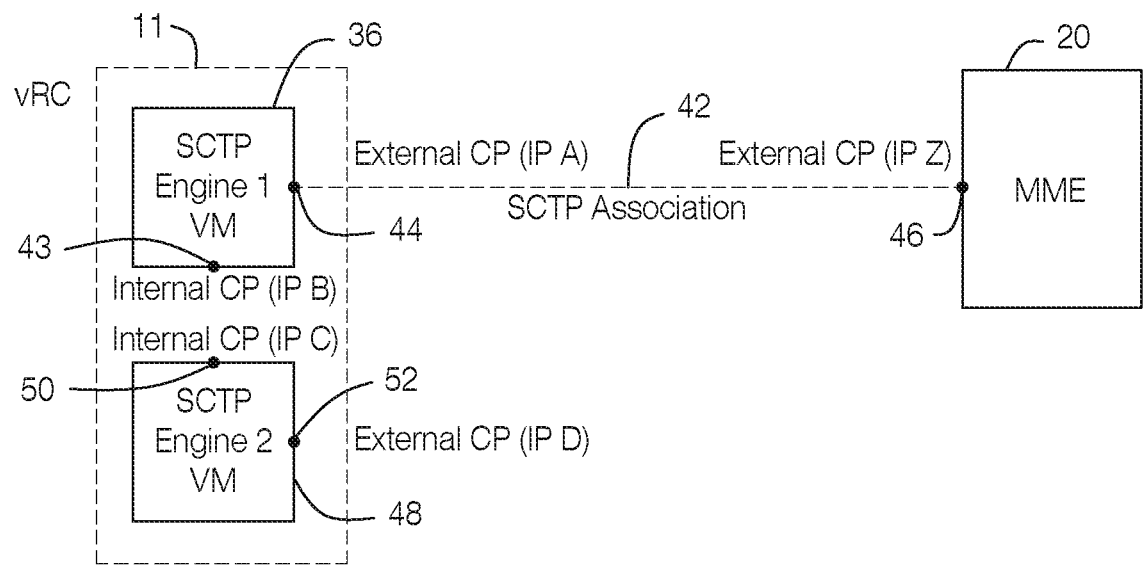
FIG. 6 illustrates the configuration of a second SCTP engine VM in accordance with principles of the present disclosure.

Referring to FIG. 6, a VNF manager (VNFM) or an NFV orchestrator (NFVO) configures a second SCTP engine VM 48 (also referred to as "second VM 48" or second SCTP VM instance 48"). Second SCTP engine VM 48 includes its own internal connection point 50 and external connection point 52. The addition of a second SCTP engine VM 48 is advantageous because certain systems, i.e., Third Generation Partnership Project (3GPP), only allow for a single SCTP association 42 between a base station and a remote node so the SCTP association 42 cannot be duplicated. In one embodiment, second SCTP engine VM 48 has the same software image as first SCTP engine VM 36 and in an alternate embodiment, second SCTP engine VM 48 has a software image different from the software image of first SCTP engine VM 36. It should be noted that both first SCTP engine VM 36 and second SCTP engine VM 48 can co-exist and work collectively since they each have separate IP addresses. For example, external connection point 44 of first SCTP engine VM 36 has an IP address of "A" and internal connection point 43 of first SCTP engine VM 36 has an IP address of "B" while external connection point 52 of second SCTP engine VM 48 has an IP address of "D" and internal connection point 50 of second SCTP engine VM 48 has an IP address of "C."

Figure 7:
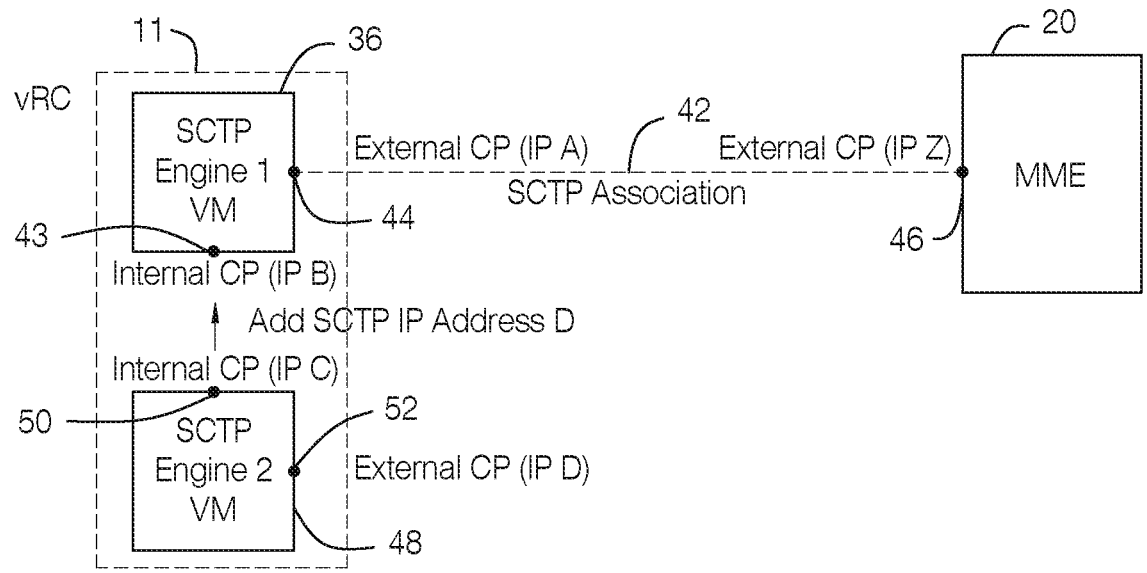
FIG. 7 illustrates the second SCTP engine VM informing the first SCTP engine VM of its availability to receive traffic in accordance with principles of the present disclosure.

As shown in FIG. 7, in the next step of the process, second SCTP engine VM 48 notifies first SCTP engine VM 36 of the availability of second SCTP engine VM 48 to receive control plane traffic and also informs first SCTP engine VM 36 of the identity of the IP address of the external connection point 52 of second SCTP engine VM 48 (i.e., "D") such that control plane traffic can start to be diverted to second SCTP engine VM 48 at its external connection point 52. In one embodiment, the notification of first SCTP engine VM 36 of the presence of second SCTP engine VM 48 occurs via communication between the internal connection point 43 of first SCTP engine VM 36 and the internal connection point 50 of second SCTP engine VM 48. First SCTP engine VM 48 is now aware of the existence and availability of second SCTP engine VM 48 to accept control plane traffic and also is aware of the IP address of the external connection point 52 of second SCTP engine VM 48 that is to receive the control plane traffic. In an alternate embodiment, second SCTP engine VM 48 communicates with an Operations, Administration, and Maintenance (OAM) node, a node controller VM, or some other entity responsible for inter-VM communication within the VNF. Thus, in such a case, the communication between second SCTP engine VM 48 and first SCTP engine VM 36 is not direct.

Figure 8:
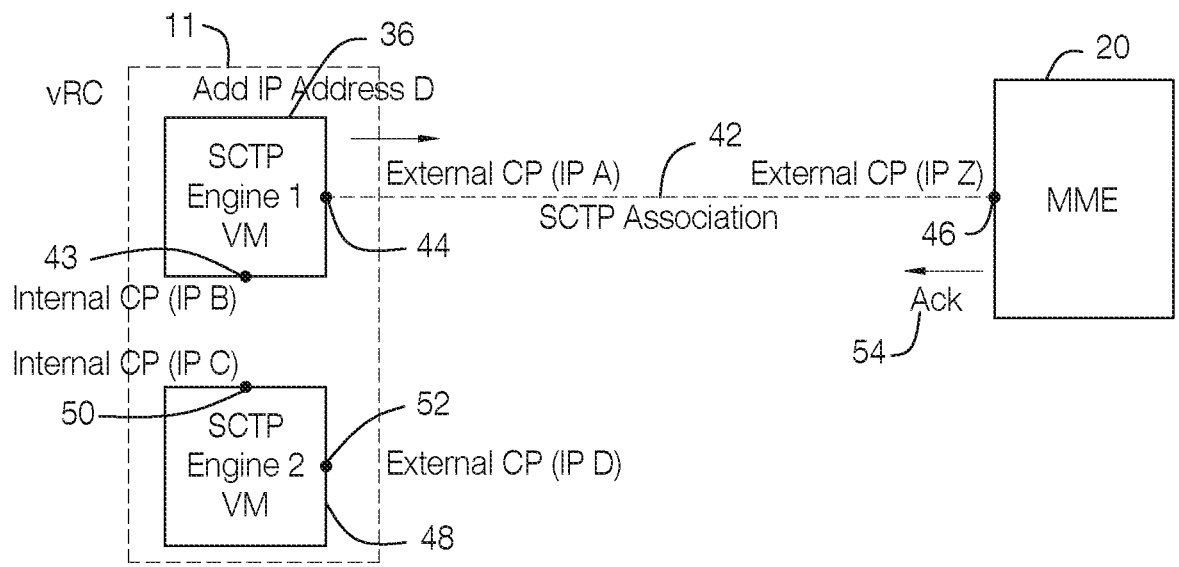
FIG. 8 illustrates the first SCTP engine VM notifying a remote node that the IP address of the second SCTP engine VM is to be added to the existing SCTP association.

As shown in FIG. 8, first SCTP engine VM 36 then instructs remote node 20 that the IP address ("D") of the connection point 52 of second SCTP engine VM 48 is to be added to the existing SCTP association 42. In one embodiment, remote node 20 sends an acknowledgement 54 to first SCTP engine VM 36 indicating that remote node 20 has been informed of the new IP address of second SCTP engine VM 48.

Figure 9:
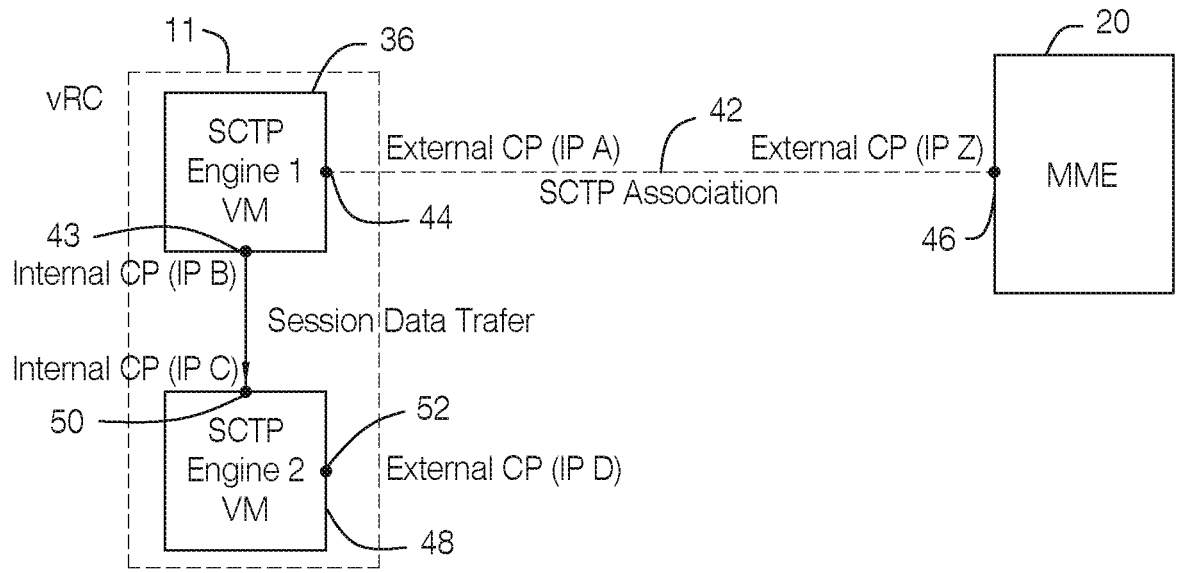
FIG. 9 illustrates the transfer of session state information from the first SCTP engine VM to the second SCTP engine VM in accordance with principles of the present disclosure.

Referring to FIG. 9, the next step is that first SCTP engine VM 36 buffers (or discards) changes to the current communication sessions with one or more wireless devices and copies all session state information to second SCTP engine VM 48. It should be noted that although the FIGS. show first SCTP engine VM 36 and second SCTP engine VM 48 to be part of vRC 11, they need not be. Thus, session state information between first SCTP engine VM 36 and second SCTP engine VM 48 is synchronized prior to instructing remote node 20 to send control plane traffic to external connection point 52 of second SCTP engine VM 48. This synchronization of session state information occurs via internal connection point 43 of first SCTP engine VM 36 and internal connection point 50 of second SCTP engine VM 48. In an alternative embodiment, the synchronization of session state information can also be implemented by the OAM, a node controller VM, or some other entity responsible for inter-VM communication within the VNF. Thus, in such a case, the synchronization of session state information between second SCTP engine VM 48 and first SCTP engine VM 36 is not direct.

Figure 10:
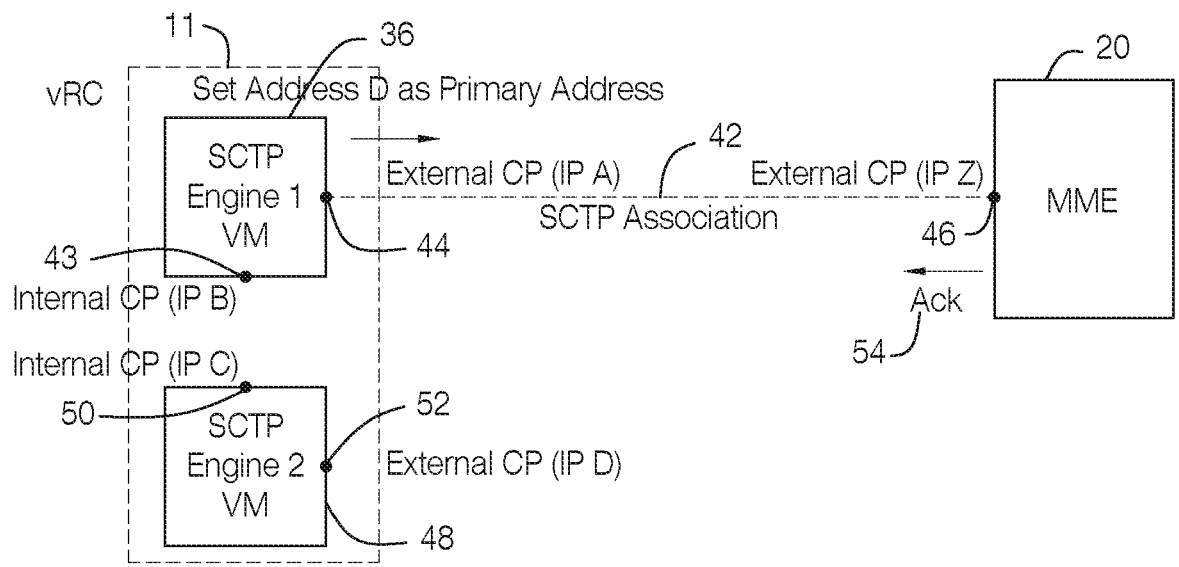
FIG. 10 illustrates the first SCTP engine VM notifying a remote node that the IP address of the second SCTP engine VM is to be used as the primary address for data transfer in accordance with principles of the present disclosure.

As shown in FIG. 10, first SCTP engine VM 36 then instructs remote node 20 to identify the IP address ("D") of the connection point 52 of second SCTP engine VM 48 as the primary address to which remote node 20 should send all future control plane traffic. It should be noted that the adding of the IP address for the second SCTP engine VM 48 (as shown in FIG. 8) could be performed in one step and the designating of the IP address of the second SCTP engine VM 48 as the primary address for remote node 20 (as shown in FIG. 10) could be performed in separate steps, or these processes could be combined and performed in a single step.

Figure 11:
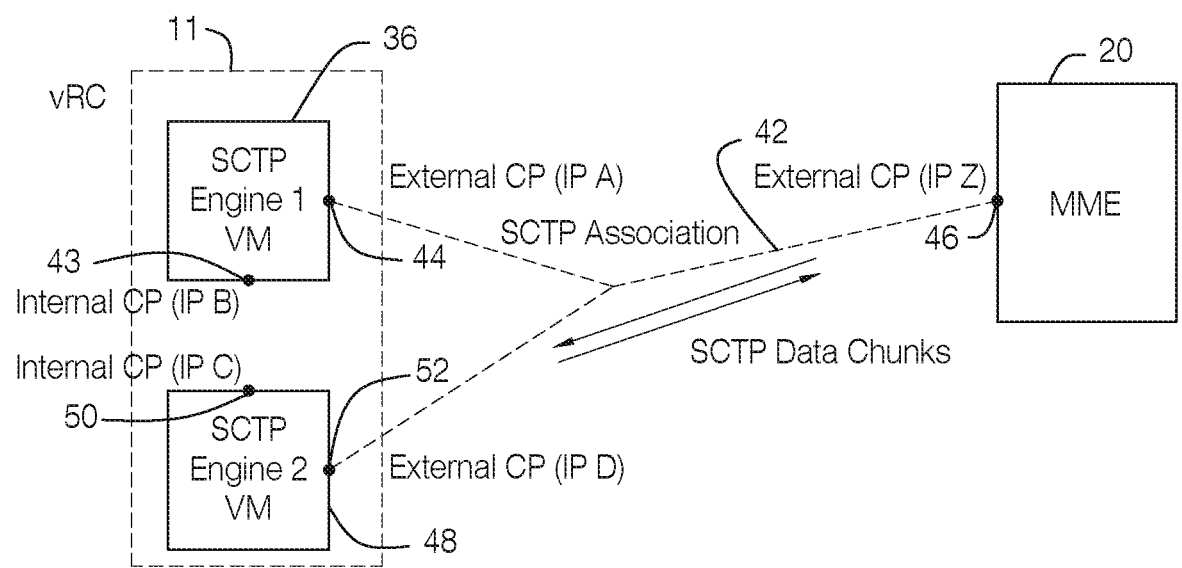
FIG. 11 illustrates the second SCTP engine VM handling existing and new wireless device sessions with the remote node in accordance with principles of the present disclosure.

As seen in FIG. 11, second SCTP engine VM 48 is now the primary destination (at external connection point 52 with IP address "D") that will handle existing and new wireless device sessions. In an alternate embodiment, remote node 20 sends an acknowledgement 54 to first SCTP engine VM 36 that remote node 20 has added the new IP address of second SCTP engine VM 48 and has designated the new IP address as the primary IP address for future exchange of control plane data (i.e., SCTP data chunks) over SCTP association 42. Thus, the acknowledgement 54 can occur either when remote node 20 has been informed that it is to add the new IP address of the external connection point 52 of second SCTP engine VM 48 and designate it as the primary IP address for communication via SCTP association 42 or the acknowledgment 54 can be sent by remote node 20 after the addition of the new IP address of the external connection point 52 of second SCTP engine VM 48 and establishment of the new IP address as the primary IP address, has occurred.

Figure 12:
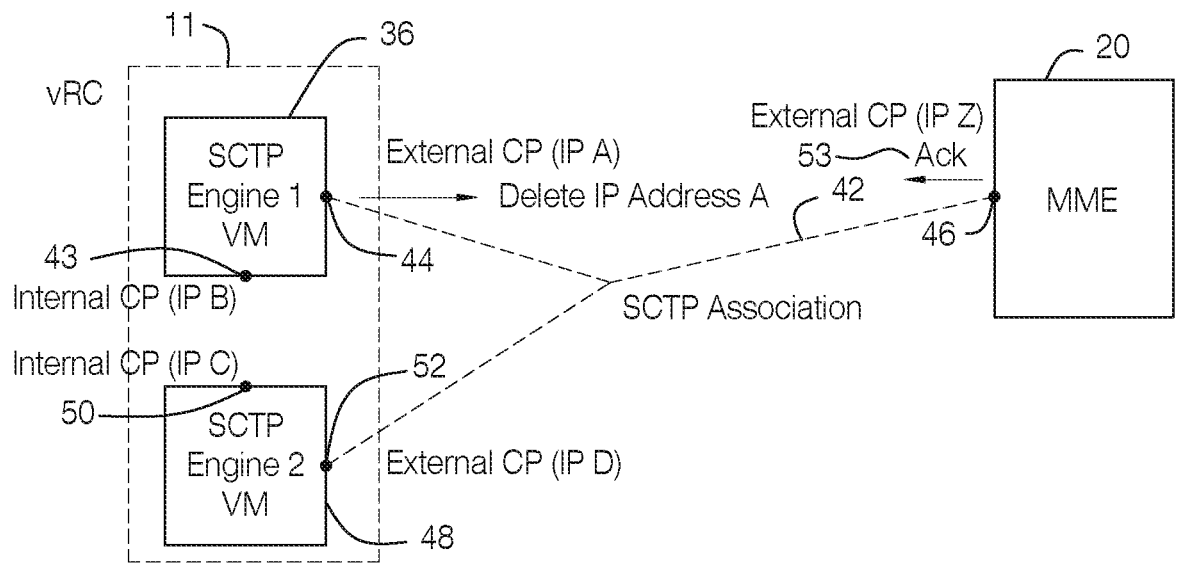
FIG. 12 illustrates the first SCTP engine VM notifying the remote node that the IP address associated with the external connection point of the first SCTP engine VM is to be removed from the SCTP association in accordance with principles of the present disclosure.
Figure 13:
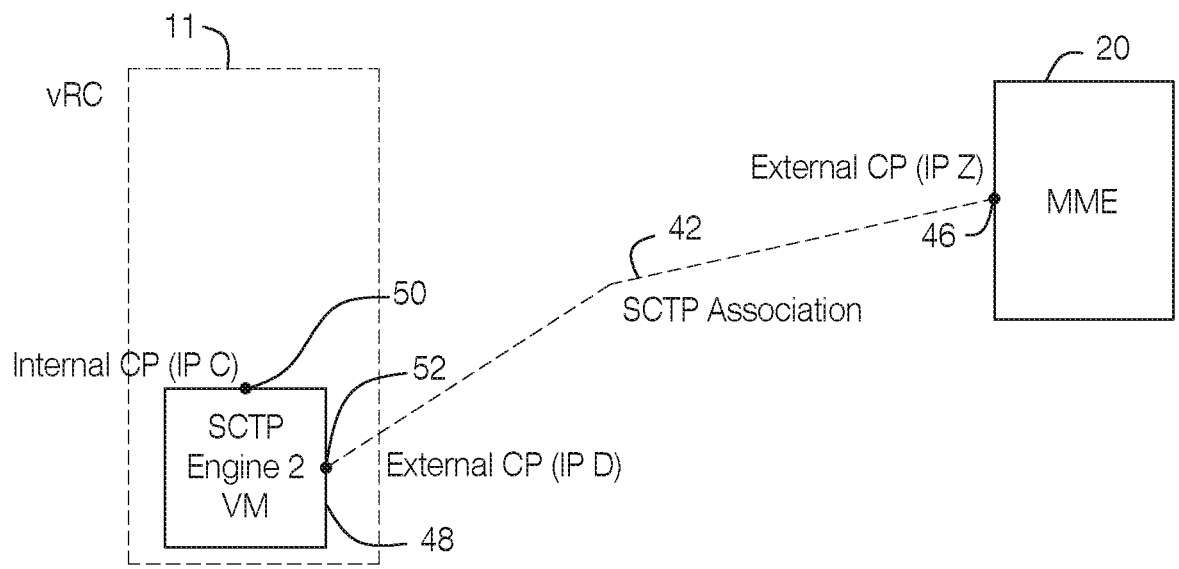
FIG. 13 illustrates the removal of the first SCTP engine VM from the SCTP association in accordance with principles of the present disclosure.

In the next step of the process, as shown in FIG. 12, first SCTP engine VM 36 optionally informs remote node 20 that the IP address ("A") of external connection point 44 of first SCTP engine VM 36 is to be removed from the existing SCTP association 42. In one embodiment, remote node 20 sends an acknowledgement 53 to first SCTP engine VM 36 acknowledging the receipt of the instruction to delete external connection point 44. Then, as shown in FIG. 13, in an optional step, the VNFM or NFVO deletes the first SCTP engine VP 36 instance. Thus, the only remaining connection of the SCTP association 42 is the connection between the external connection point 46 of remote node 20 and the external connection point 52 of second SCTP engine VM 48. Accordingly, embodiments of the present disclosure maintain existing connections between VNF 10 and a remote peer node 20 and/or updated the connections between the two entities dynamically by signaling and providing address availability without impacting existing user sessions during an VNF healing and upgrading process.

Figure 14:
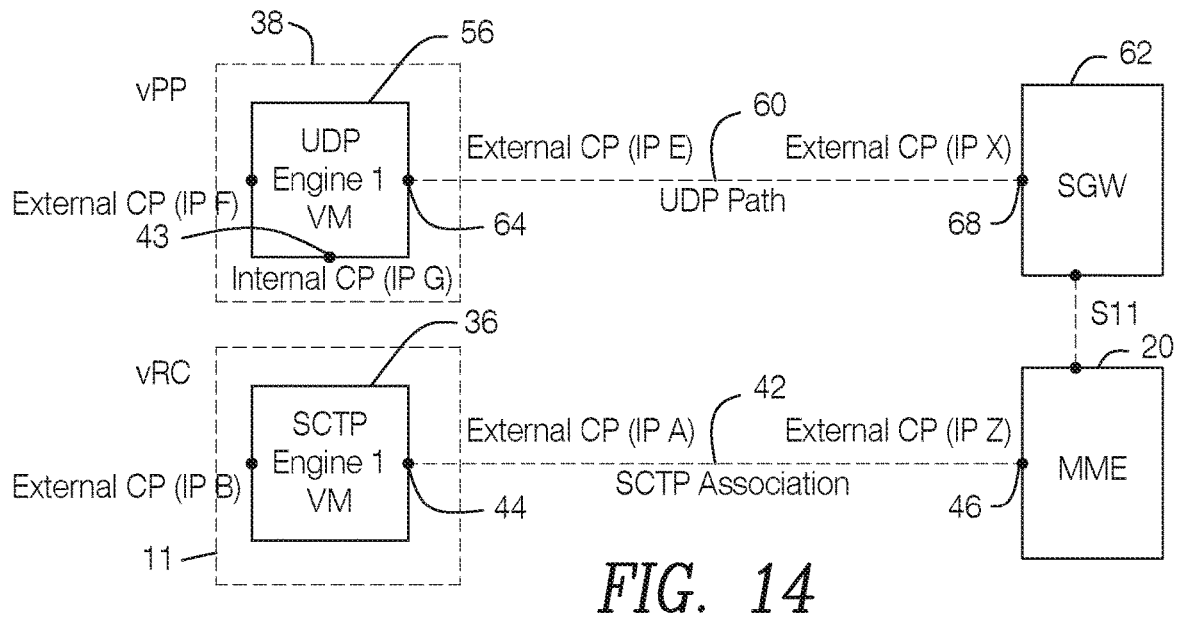
FIG. 14 illustrates an alternate embodiment where a UDP path is established between a UDP engine VM of a vPP and a remote user plane node in accordance with principles of the present disclosure.

FIGS. 14-21 illustrate another embodiment of the present disclosure relating to lifecycle management (LCM) procedures for a UDP Engine VM 56 with dynamic address reconfiguration and path switchover, i.e., in a connectionless environment. Referring to FIG. 14, as a pre-condition, a connectionless transport protocol path 60, such as, for example a UDP path, is established between a first UDP engine VM 56 (also referred to as a "first UDP VM instance 56") and a remote user plane node (i.e., serving gateway (SGW)) 62. The ensuing discussion (and the Figures) shall refer to the connectionless transport protocol path as a "UDP path" although other connectionless transport protocols may be utilized. First UDP engine VM 56 could be a Packet Data Convergence Protocol (PDCP)/General Packet Radio Service (GPRS) Tunneling Protocol User Plane (GTP-U) protocol on a VNF 10 such as a virtual packaging processer (vPP) 38. In the following discussion and associated figures, VNF 10 resides on a vPP 38. However, it is understood that this is just one embodiment of the present disclosure. The UDP path 60 is established between first UDP engine VM 56 and remote user plane node 62 via external connection point 64 of UDP engine VM 56 and external connection point 66 of remote user plane node 62. As shown in FIGS. 5-12 and as described above, SCTP engine VM 36 communicates with remote node (i.e., MME) 20 via an established SCTP association 42 through the external connection point 44 of SCTP engine VM 36 and the external connection point 46 of remote node 20. SCTP engine VM 36 can be part of a control plane node such as vRC 11. UDP path 60 represents the user plane for a network node such as a base station or eNB and provides for data transfer between first UDP engine VM 56 and remote user plane node 62. SCTP association 42 represents the control plane of the network node and is used to establish and control radio bearers.

Figure 15:
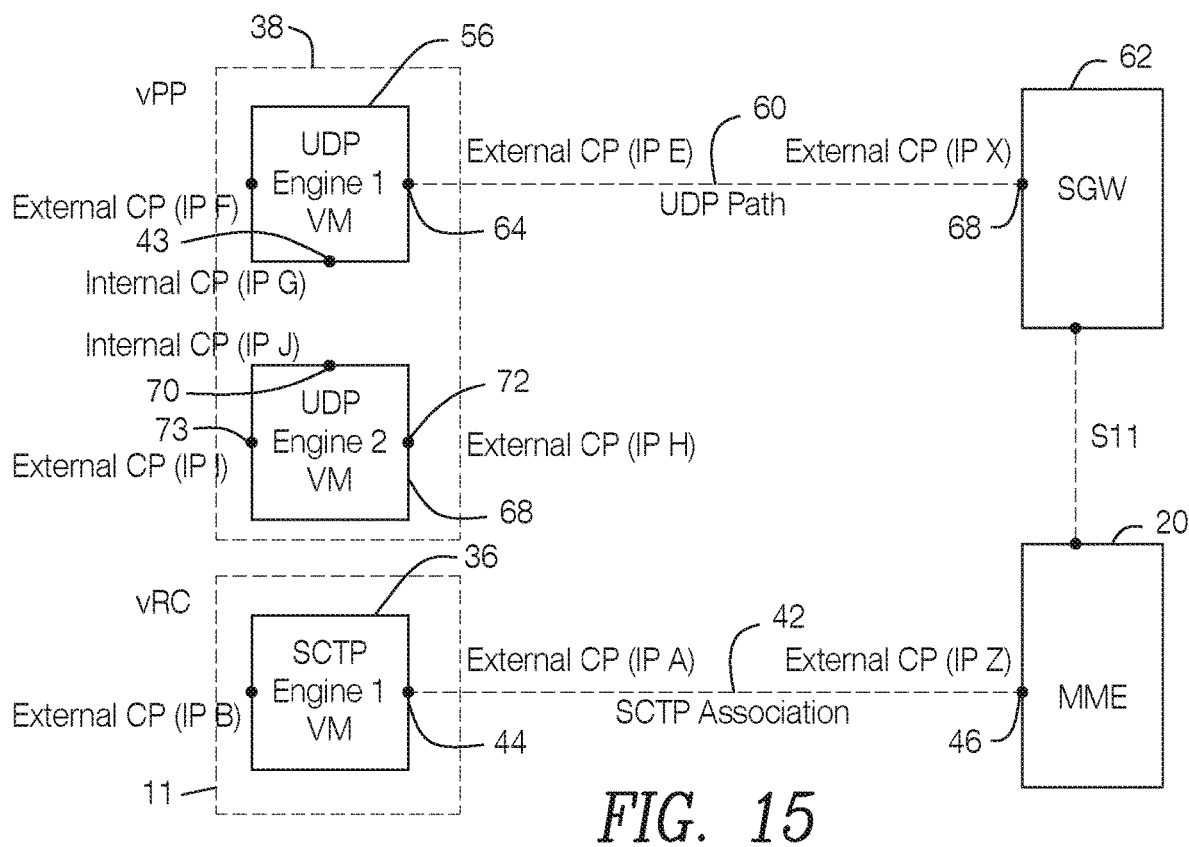
FIG. 15 illustrates the configuration of a second UDP engine VM in accordance with principles of the present disclosure.
Figure 16:
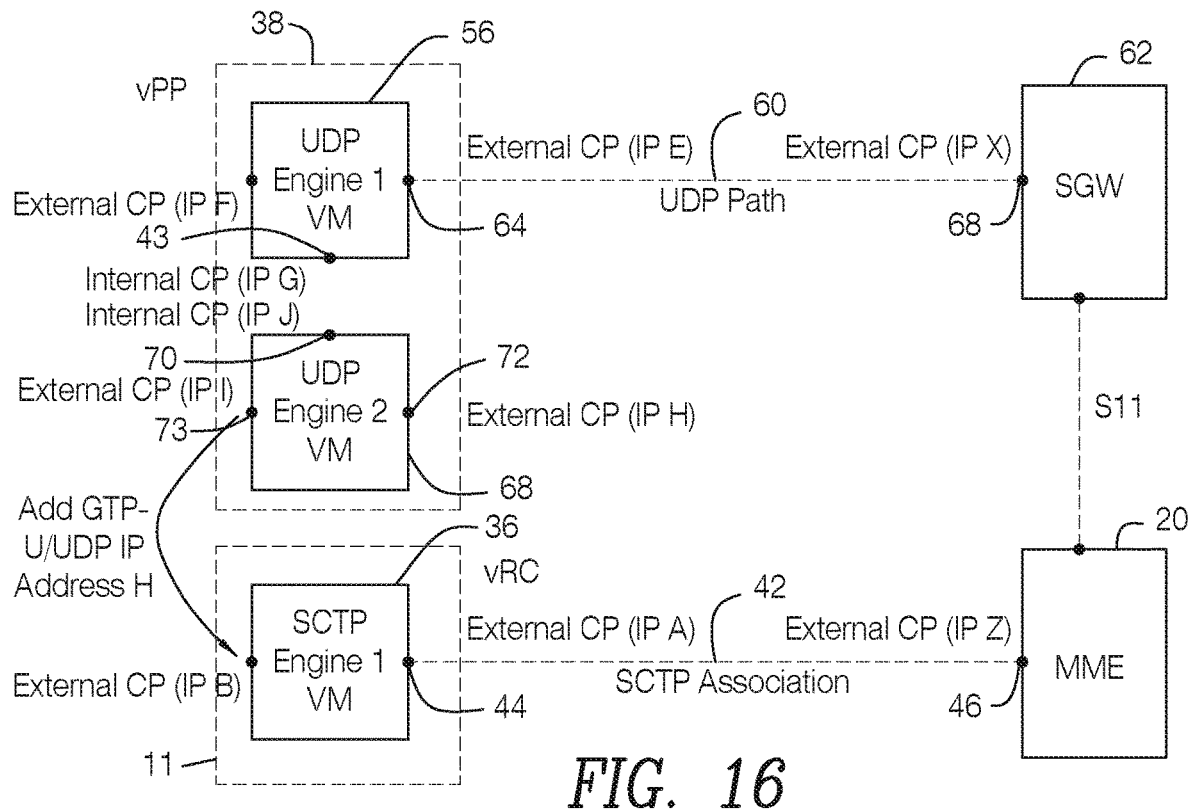
FIG. 16 illustrates the second UDP engine VM informing the control node of its availability in accordance with principles of the present disclosure.

Next, as shown in FIG. 15, a VNFM or NFVO configures a second UDP engine VM 68 (optionally, with a new SGW) including internal connection point 70 and external connection point 72, each connection point having its own unique IP address. In one embodiment, first UDP engine VM 56 and second UDP engine 68 are part of vPP 38. However, in other embodiments, first UDP engine VM 56 and second UDP engine 68 need not be both part of vPP 38. Second UDP engine 68 then informs the control node, i.e., SCTP engine VM 36 of vRC 11 of the availability of second UDP engine 68 and the new external connection point 73 of second UDP engine 68, as shown in FIG. 16.

Figure 17:
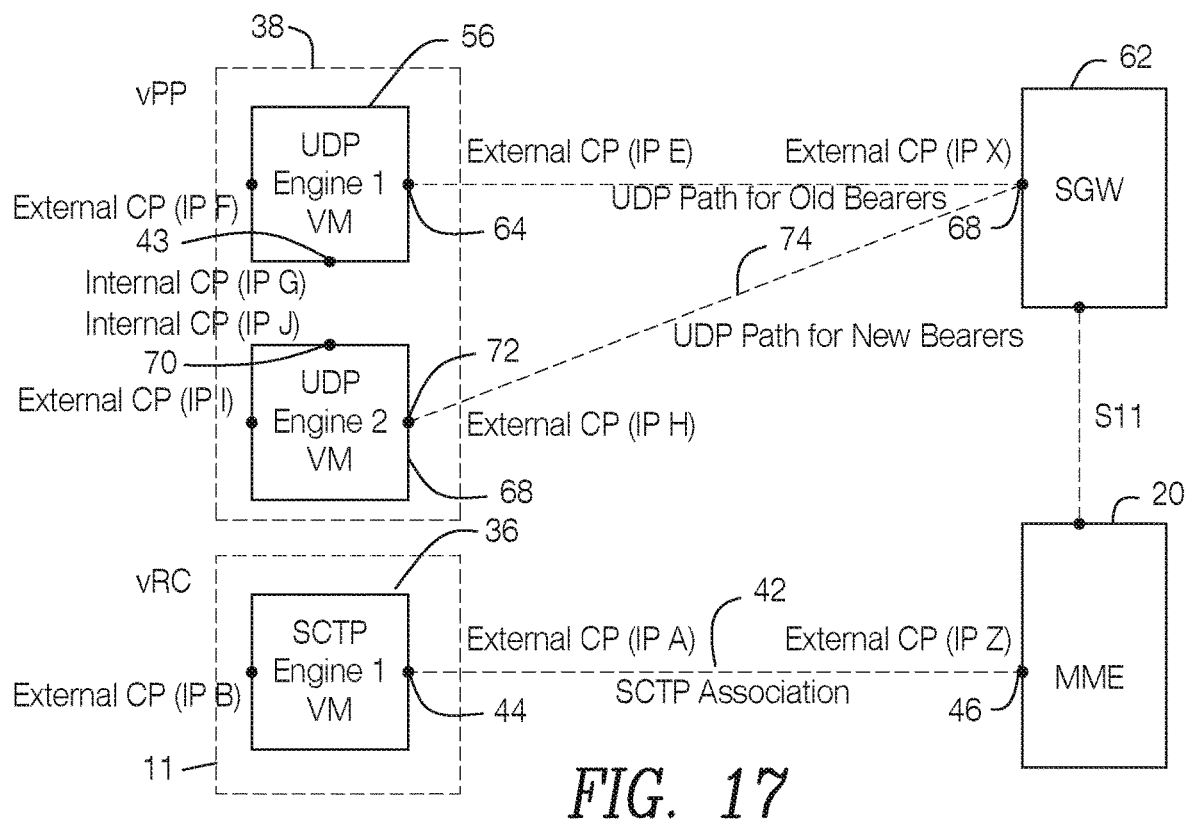
FIG. 17 illustrates new bearers being set up on a new UDP path in accordance with principles of the present disclosure.
Figure 18:
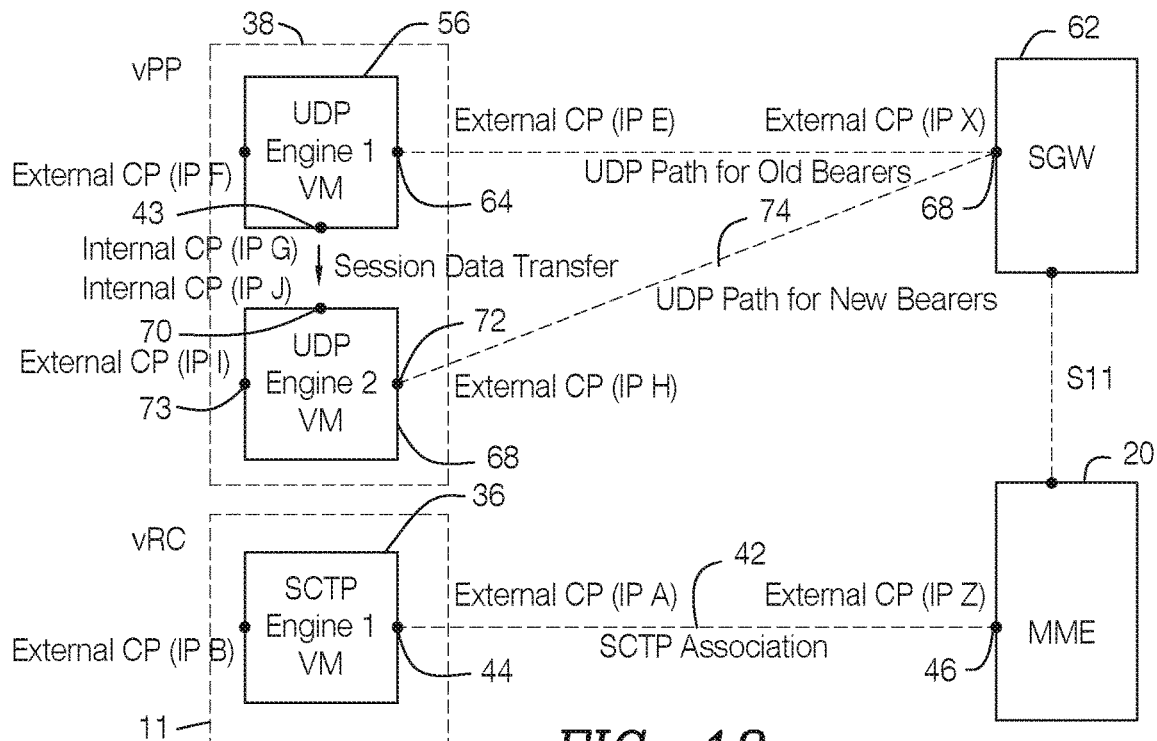
FIG. 18 illustrates the first UDP engine VM transferring session state information to the second UDP engine VM in accordance with principles of the present disclosure.

Once the second UDP engine 68 has been established, a new UDP path 74 is established between second UDP engine VM 68 and remote user plane node 62 for new bearers, as depicted in FIG. 17. The new UDP path 74 is established between a different external connection point than the original UDP path 60. Specifically, the new UDP path 74 for new bearers is established between external connection point 72 of UDP engine VM 68 and external connection point 68 of remote user plane node 62. It should be noted that external connection point 72 of second UDP engine VM 68 has a different IP address (i.e., "H") than external connection point 64 of first UDP engine VM 56 (i.e., "E"). At this point, while the new UDP path 74 is used for new bearers, old bearers remain anchored on UDP path 60. The "old" UDP VM instance, i.e., first UDP engine VM 56 then copies all session state information to the new VM instance, i.e., second UDP engine 68. Thus, user plane session state information is synchronized between first UDP engine VM 56 and second UDP engine VM 68, as shown in FIG. 18.

Figure 19:
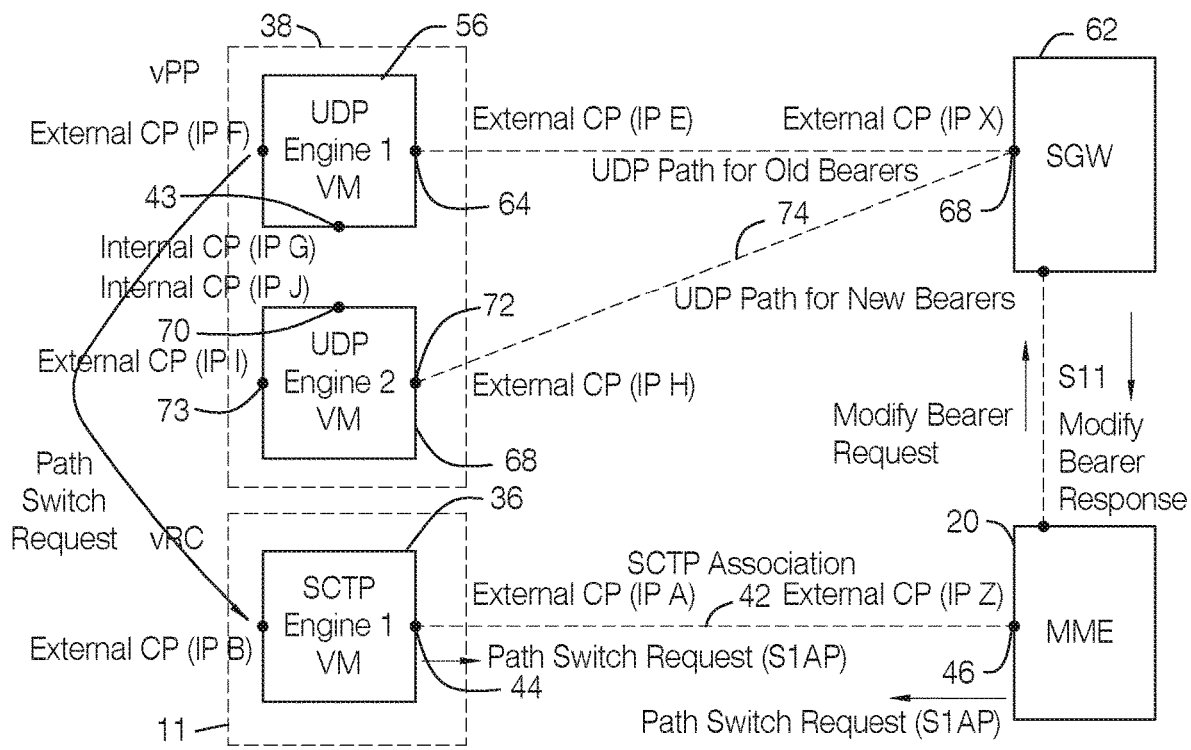
FIG. 19 illustrates the first UDP engine VM notifying the vRC to trigger path switchover for each old bearer or group of bearers in accordance with principles of the present disclosure.
Figure 20:
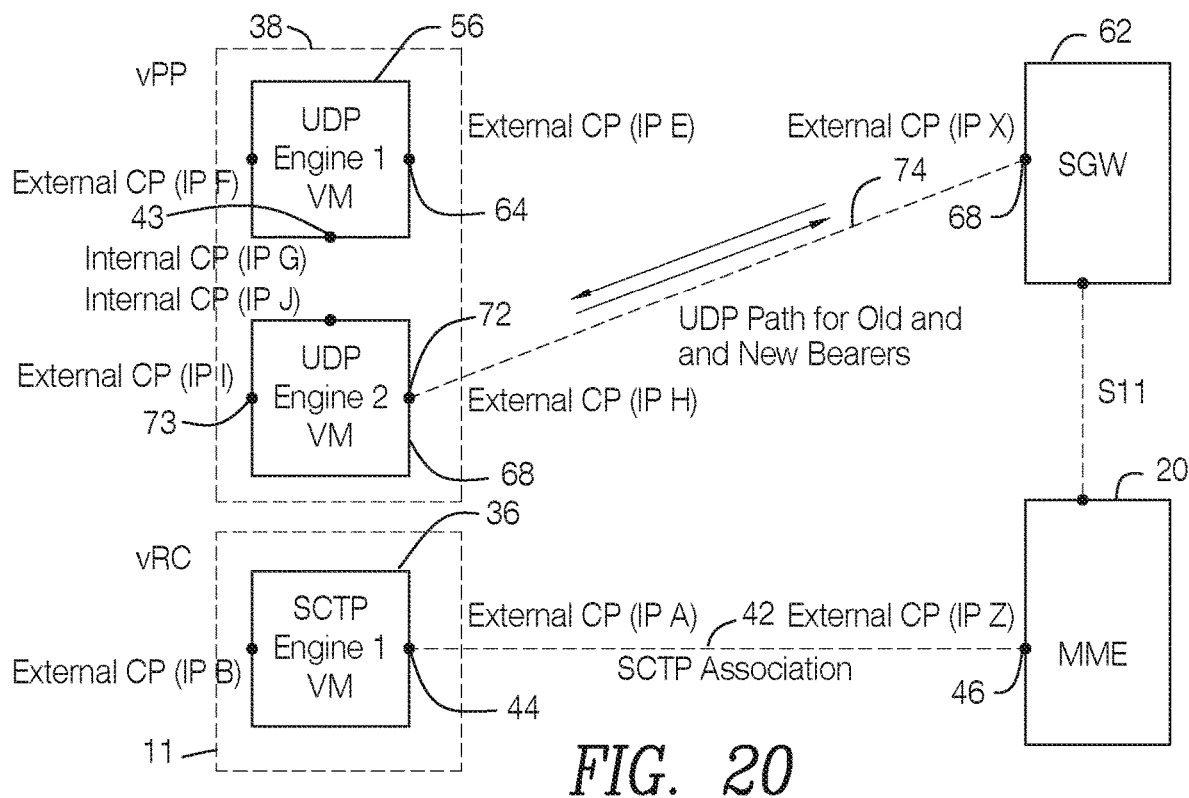
FIG. 20 illustrates the second UDP engine VM handling both old and new bearers in accordance with principles of the present disclosure.

Referring now to FIGS. 19 and 20, first UDP engine VM 56 then informs vRC 11 to trigger a path switchover for each old bearer (or group of old bearers) from UDP path 60 to UDP path 74 (FIG. 19). At this point, the new UDP VM instance (i.e., second UDP engine VM 68) handles all bearers, i.e., old bearers and new bearers, via the newly created UDP path 74. The "old" UDP path, i.e., UDP path 60 (as seen in FIG. 19) no longer exists (as seen in FIG. 20).

Figure 21:
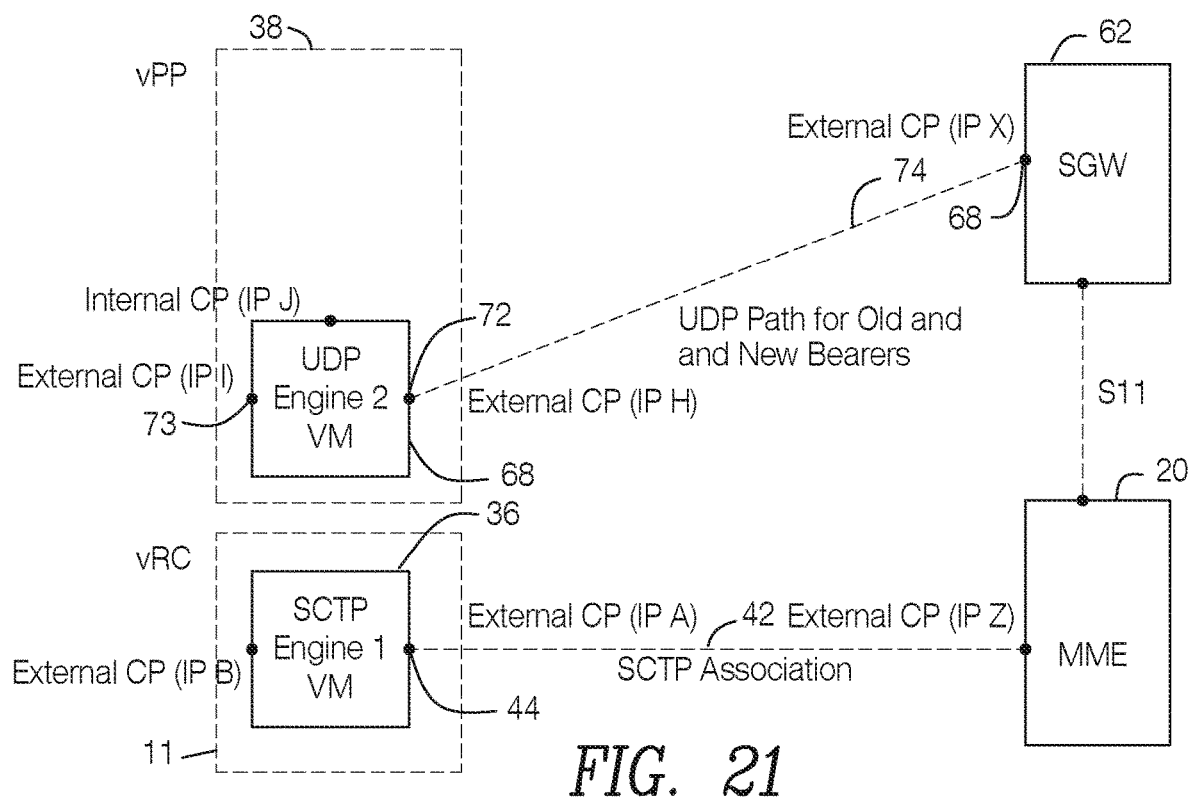
FIG. 21 illustrates the removal of the first UDP engine VM from the UDP path in accordance with principles of the present disclosure.

Finally, FIG. 21 shows an optional step where the VNFM or NFVO deletes the "old" UDP VM instance, i.e., first UDP engine VM 56, since it is no longer part of the UDP path between vRC 11 and remote user plane node 62.

Figure 22:
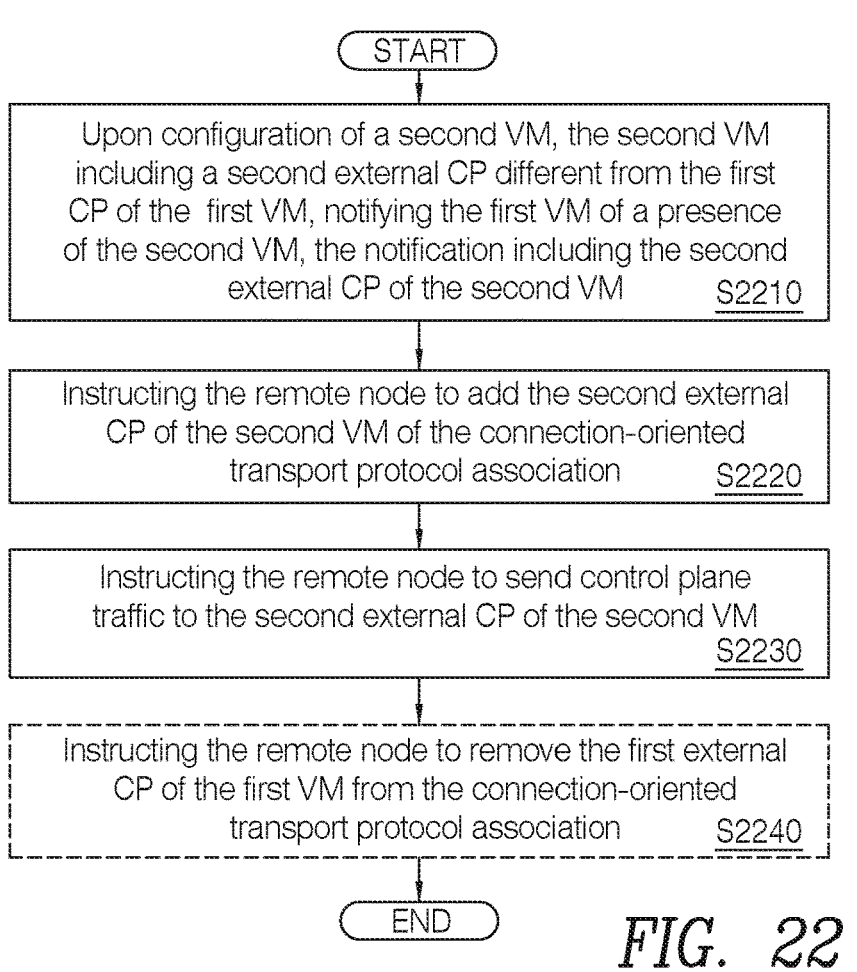
FIG. 22 is a flow diagram illustrating an exemplary method performed by a VNF, for example, a vRC, in accordance with principles of the present disclosure.

FIG. 22 depicts a flow diagram identifying steps of one embodiment of the present disclosure. Method 52200 includes a series of steps performed by VNF 10, for maintaining a connection-oriented transport protocol association 42 for carrying control plane traffic between VNF 10 and a remote node 20 based on the general concepts discussed above with respect to FIGS. 5-13. Specifically, the processes shown in FIG. 13 are performed by processing circuitry 14 in conjunction with matching code 18 of VNF 10. As shown in the above figures, VNF 10 includes a first VM 36 having a first external connection point (CP) 44. In one embodiment, upon configuration of a second VM 48, the second VM 48 including a second external CP 52 different from the first CP 44 of the first VM, method 52200 includes notifying the first VM 36 of a presence of the second VM 48, the notification including the second external CP 52 of the second VM 48 (Block S2210), instructing the remote node 20 to add the second external CP 52 of the second VM 48 to the connection-oriented transport protocol association 42 (Block S2220), and instructing the remote node 20 to send control plane traffic to the second external CP 52 of the second VM 48 (Block S2230). In an optional step, method 52200 includes instructing the remote node 20 to remove the first external CP 44 of the first VM 36 from the connection-oriented transport protocol association 42 (Block S2240).

In one embodiment, VNF 10 includes the first VM 36 and the second VM 48.

In one embodiment, VNF 10 is a vRC.

In one embodiment, method 52200 further includes receiving an acknowledgement 54 that remote node 20 has received the instruction to send control plane traffic to the second external CP 52 of the second VM 48.

In one embodiment, method S2220 further includes receiving an acknowledgement 53 that remote node 20 has received the instruction to remove the first external CP 44 of the first VM 36 from the connection-oriented transport protocol association 42.

In one embodiment, remote node 20 is an MME.

In one embodiment, the connection-oriented transport protocol is an SCTP.

In one embodiment, the connection-oriented transport protocol is a TCP.

In one embodiment, method S2220 further includes synchronizing session state information between first VM 36 and second VM 48 prior to instructing remote node 20 to send control plane traffic to the second external CP 52 of the second VM 48.

In one embodiment, the session state information is synchronized via a first internal CP 44 of first VM 36 and a second internal CP 50 of second VM 48.

In one embodiment, notifying first VM 36 of the presence of second VM 48 is via a first internal CP 43 of first VM 36 and a second internal CP 50 of second VM 48.

Figure 23:
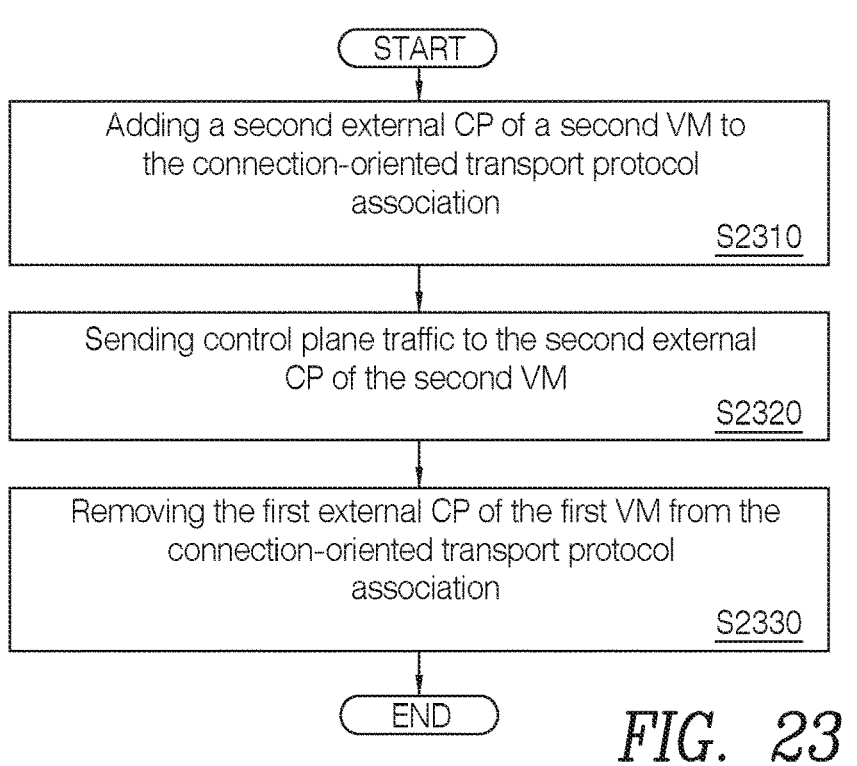
FIG. 23 is a flow diagram illustrating an exemplary method performed by a remote node in accordance with principles of the present disclosure.

FIG. 23 depicts a flow diagram identifying steps of one embodiment of the present disclosure. Method S2300 includes a series of steps performed by, for example, remote node (i.e., MME) 20 for maintaining a connection-oriented transport protocol association 42 for carrying control plane traffic between VNF 10 and remote node 20, where VNF 10 includes a first VM 36 having a first external connection point CP 44 based on the general concepts discussed above with respect to FIGS. 5-13. Specifically, the processes shown in FIG. 23 are performed by processor 28 in conjunction with connection maintenance code 32 of remote node 20. In one embodiment, method S2300 includes adding a second external CP 52 of second VM 48 to the connection-oriented transport protocol association 42 (Block S2310), sending control plane traffic to the second external CP 52 of the second VM 48 (Block S2320), and removing the first external CP 44 of first VM 36 from the connection-oriented transport protocol association 42 (Block S2330).

In one embodiment, remote node 20 is a MME.

In one embodiment, method S2300 further includes sending an acknowledgement 54 to first VM 36 indicating that remote node 20 has received the instruction to send control plane traffic to the second external CP 52 of second VM 48.

In one embodiment, method S2300 further includes sending an acknowledgement 53 to first VM 36 indicating that remote node 20 has received the instruction to remove the first external CP 44 of first VM 36 from the connection-oriented transport protocol association 42.

Figure 24:
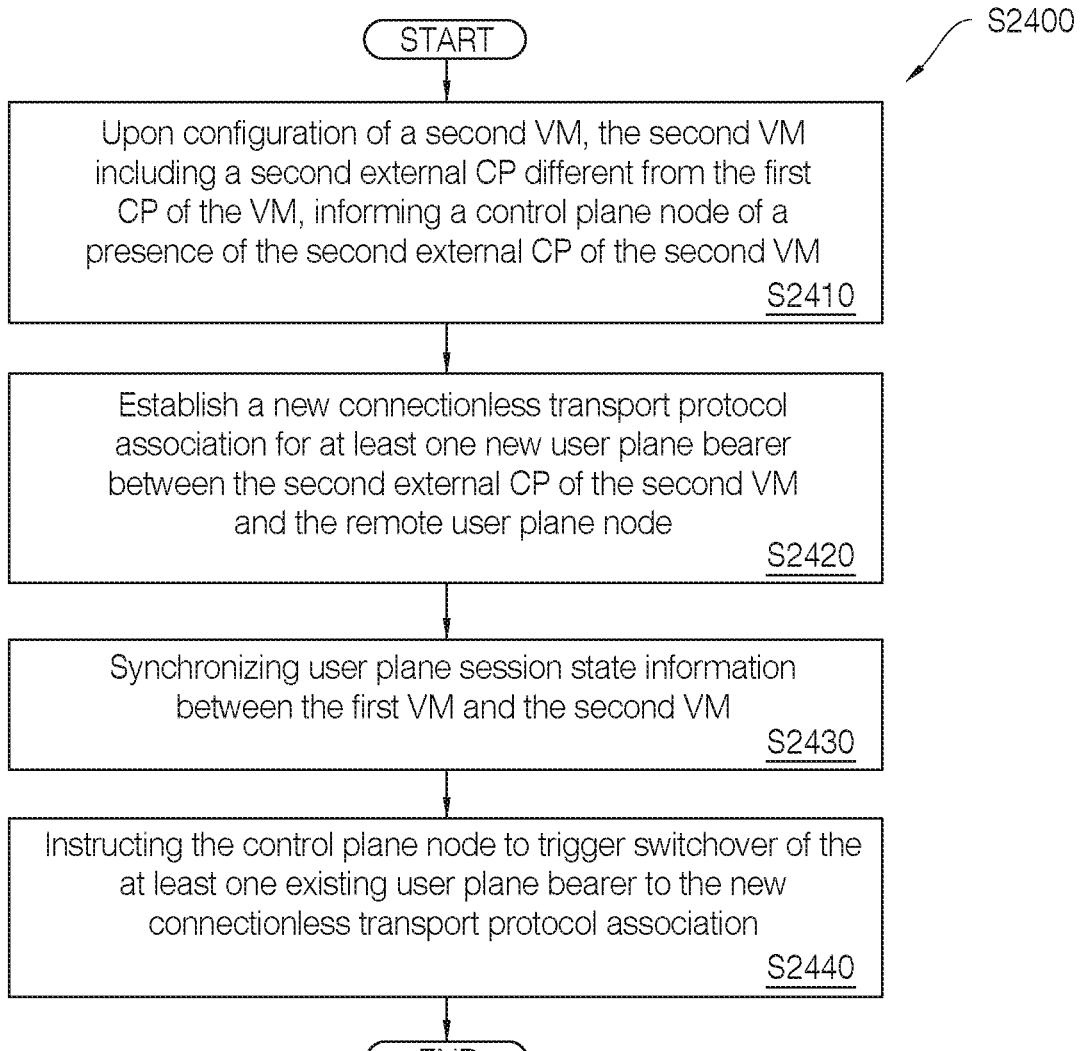
FIG. 24 is a flow diagram of an alternate embodiment of an exemplary method performed by a VNF, for example, a vPP, in accordance with the principles of the present disclosure.

FIG. 24 depicts a flow diagram identifying steps of one embodiment of the present disclosure. Method S2400 includes steps for maintaining at least one existing user plane bearer carried over a connectionless transport protocol association 60 between a VNF 10, and a remote user plane node 62. In one embodiment, the connectionless transport protocol is a UDP based on the general concepts discussed above with respect to FIGS. 14-21. The VNF 10 is, in one embodiment, a vPP 38. vPP 38 includes a first UDP engine VM 56 having a first external connection point (CP) 64. Specifically, the processes shown in FIG. 24 are performed by processing circuitry 14 in conjunction with plane bearer maintenance code 34 of vPP 38. Upon configuration of a second UDP VM 68, the second UDP VM 68 including a second external CP 72 different from the first CP 64 of the first UDP VM 56, method S2400 further includes informing a control plane node, VNF (i.e., vRC) 10, of a presence of the second external CP 72 of second UDP VM 68 (Block S2410), establishing a new connectionless transport protocol association 74 for at least one new user plane bearer between the second external CP 72 of the second UDP VM 68 and remote user plane node 62 (Block S2420), synchronizing user plane session state information between first UDP VM 56 and second UDP VM 68 (Block S2430), and instructing the control plane node VNF 10 (i.e., vRC) to trigger switchover of the at least one existing user plane bearer to the new connectionless transport protocol association 74.

In one embodiment, remote user plane node 62 is a SGW.

In one embodiment, vPP 38 includes the first UDP VM 56 and the second UDP VM 68.

Figure 25:
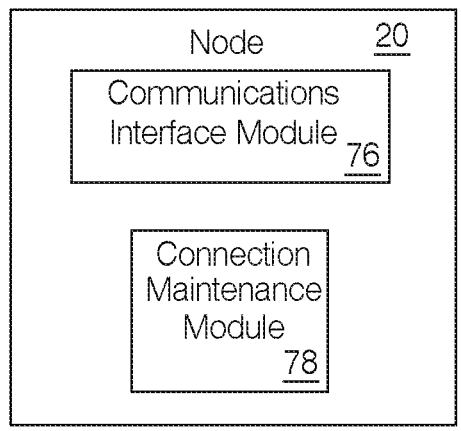
FIG. 25 is a block diagram of an alternate node, such as an MME, in accordance with principles of the present disclosure.

FIG. 25 shows an alternate node 20 configured to maintain a connection-oriented transport protocol association 62 for carrying control plane traffic between VNF 10 and the node 20. VNF includes a first VM 36, having a first external connection point (CP) 44 based on the general concepts discussed above with respect to FIGS. 13-20. Node 20 includes a communications interface module 76 and a connection maintenance module 78. The connection maintenance module is configured to add a second external CP 52 of a second VM 48 to the connection-oriented transport protocol association 42. Communications interface module 76 is configured to send control plane traffic to the second external CP 52 of second VM 48. Connection maintenance module 78 is further configured to, optionally, remove the first external CP 44 of first VM 36 from the connection-oriented transport protocol association 42.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of maintaining a connection-oriented transport protocol association for carrying control plane traffic between a virtualized network function, VNF, including a first virtual machine, VM, having a first external connection point, CP, and a remote node, the method comprising:
   as a result of determining to at least one of heal, upgrade and update the first VM, creating a VM instance identifier, instantiating a second VM and configuring the second VM;
   upon configuration of the second VM, the second VM including a second external CP different from the first external CP of the first VM, notifying the first VM of a presence of the second VM, the notification including the second external CP of the second VM;
   instructing the remote node to add the second external CP of the second VM to the connection-oriented transport protocol association; and
   instructing the remote node to send control plane traffic to the second external CP of the second VM.

2. The method of claim 1, further comprising instructing the remote node to remove the first external CP of the first VM from the connection-oriented transport protocol association.

3. The method of claim 1, wherein the VNF includes the first VM and the second VM.

4. The method of claim 1, wherein the VNF is a virtual radio controller, vRC.

5. The method of claim 1, further comprising receiving an acknowledgement that the remote node has received the instruction to send control plane traffic to the second external CP of the second VM.

6. The method of claim 1, further comprising receiving an acknowledgement that the remote node has received the instruction to remove the first external CP of the first VM from the connection-oriented transport protocol association.

7. The method of claim 1, wherein the connection-oriented transport protocol is a stream control transmission protocol, SCTP.

8. The method of claim 1, wherein notifying the first VM of the presence of the second VM is via a first internal CP of the first VM and a second internal CP of the second VM.

9. The method of claim 1, further comprising, synchronizing session state information between the first VM and the second VM prior to instructing the remote node to send control plane traffic to the second external CP of the second VM.

10. The method of claim 9, wherein the session state information is synchronized via a first internal CP of the first VM and a second internal CP of the second VM.

11. A virtualized network function, VNF, configured to maintain a connection-oriented transport protocol association for carrying control plane traffic between the VNF and a remote node, the VNF including a first virtual machine, VM, having a first external connection point, CP, the VNF running in a cloud computing environment providing processing circuits and memory for running the VNF, the memory containing instructions executable by the processing circuits, the VNF being configured to:
   as a result of a determination to at least one of heal, upgrade and update the first VM, create a VM instance identifier, instantiate a second VM and configure the second VM;
   upon configuration of the second VM, the second VM including a second external CP different from the first external CP of the first VM, notify the first VM of a presence of the second VM, the notification including the second external CP of the second VM;

instruct the remote node to add the second external CP of the second VM to the connection-oriented transport protocol association; and instruct the remote node to send control plane traffic to the second external CP of the second VM.

12. The VNF of claim 11, wherein the VNF is further configured to instruct the remote node to remove the first external CP of the first VM from the connection-oriented transport protocol association.

13. The VNF of claim 11, wherein the VNF includes the first VM and the second VM.

14. The VNF of claim 11, wherein the VNF is a virtual radio controller, vRC.

15. The VNF of claim 11, the VNF further configured to receive an acknowledgement that the remote node has received the instruction to send control plane traffic to the second external CP of the second VM.

16. The VNF of claim 11, the VNF further configured to receive an acknowledgement that the remote node has received the instruction to remove the first external CP of the first VM from the connection-oriented transport protocol association.

17. The VNF of claim 11, wherein the connection-oriented transport protocol is a stream control transmission protocol, SCTP.

18. The VNF of claim 11, wherein notifying the first VM of the presence of the second VM is via a first internal CP of the first VM and a second internal CP of the second VM.

19. The VNF of claim 11, the VNF further configured to synchronize session state information between the first VM and the second VM prior to instructing the remote node to send control plane traffic to the second external CP of the second VM.

20. The VNF of claim 19, wherein the session state information is synchronized via a first internal CP of the first VM and a second internal CP (50) of the second VM.

21. A method of maintaining a connection-oriented transport protocol association for carrying control plane traffic between a virtualized network function, VNF, including a first virtual machine, VM, having a first external connection point, CP, and a remote node, the method comprising:

as a result of determining to at least one of heal, upgrade and update the first virtual machine, creating a VM instance identifier, instantiating a second VM and configuring the second VM;

adding a second external CP of a second VM to the connection-oriented transport protocol association;

sending control plane traffic to the second external CP of the second VM; and removing the first external CP of the first VM from the connection-oriented transport protocol association.

22. A node configured to maintain a connection-oriented transport protocol association for carrying control plane traffic between a virtualized network function, VNF, including a first virtual machine, VM, having a first external connection point, CP, and the node, the node comprising:

processing circuitry including a memory and a processor, the memory in communication with the processor, the memory having instructions that, when executed by the processor, configure the processor to:

as a result of a determination to at least one of heal, upgrade and update the first VM, create a VM instance identifier, instantiate a second VM and configure the second VM;

add a second external CP of the second VM to the connection-oriented transport protocol association; and a communications interface configured to send control plane traffic to the second external CP of the second VM, the processor further configured to remove the first external CP of the first VM from the connection-oriented transport protocol association.

23. A method of maintaining at least one existing user plane bearer carried over a connectionless transport protocol association between a virtualized network function, VNF, including a first virtual machine, VM, having a first external connection point, CP, and a remote user plane node, the method comprising:

as a result of a determination to at least one of heal, upgrade and update the first VM, create a VM instance identifier, instantiate a second VM and configure the second VM;

upon configuration of the second VM, the second VM including a second external CP different from the first external CP of the first VM, informing a control plane node of a presence of the second external CP of the second VM;

establishing a new connectionless transport protocol association for at least one new user plane bearer between the second external CP of the second VM and the remote user plane node;

synchronizing user plane session state information between the first VM and the second VM; and instructing the control plane node to trigger switchover of the at least one existing user plane bearer to the new connectionless transport protocol association.

24. The method of claim 23, wherein the remote user plane node is a serving gateway, SGW.

25. The method of claim 23, wherein the VNF includes the first VM and the second VM.

26. The method of claim 23, wherein the VNF is a virtual package processer, vPP.

27. The method of claim 23, wherein the control plane node is a virtual radio controller, vRC.

28. A virtualized network function, VNF, configured to maintain at least one existing user plane bearer carried over a connectionless transport protocol association between the VNF and a remote user plane node, the VNF including a first virtual machine, VM, having a first external connection point, CP, the VNF running in a cloud computing environment providing processing circuits and memory for running the VNF, the memory containing instructions executable by the processing circuits, the VNF NF being configured to:

as a result of a determination to at least one of heal, upgrade and update the first VM, create a VM instance identifier, instantiate a second VM and configure the second VM;

upon configuration of a second VM, the second VM including a second external CP different from the first CP of the first VM, inform a control plane node of a presence of the second external CP of the second VM;

establish a new connectionless transport protocol association for at least one new user plane bearer between the second external CP of the second VM and the remote user plane node;

synchronize user plane session state information between the first VM and the second VM; and instruct the control pane node to trigger switchover of the at least one existing user plane bearer to the new connectionless transport protocol association.

29. The VNF of claim 28, wherein the remote user plane node is a serving gateway, SGW.

30. The VNF of claim 28, wherein the VNF includes the first VM and the second VM.

31. The VNF of claim 28, wherein the VNF is a virtual package processor, vPP.

32. The VNF of claim 28, wherein the control plane node is a virtual radio controller, vRC.

* * * * *